US012083497B2

(12) United States Patent
Lee et al.

(10) Patent No.: US 12,083,497 B2
(45) Date of Patent: Sep. 10, 2024

(54) PREPARATION METHOD OF SUPER ABSORBENT POLYMER AND SUPER ABSORBENT POLYMER PREPARED THEREFROM

(71) Applicant: LG Chem, Ltd., Seoul (KR)

(72) Inventors: Sang Gi Lee, Daejeon (KR); Mookon Kim, Daejeon (KR); Yong Hun Lee, Daejeon (KR); Hyemi Nam, Daejeon (KR); Jiyoon Jeong, Daejeon (KR); Chang Hun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 428 days.

(21) Appl. No.: 17/413,793

(22) PCT Filed: May 4, 2020

(86) PCT No.: PCT/KR2020/005854
§ 371 (c)(1),
(2) Date: Jun. 14, 2021

(87) PCT Pub. No.: WO2020/226385
PCT Pub. Date: Nov. 12, 2020

(65) Prior Publication Data
US 2022/0016599 A1 Jan. 20, 2022

(30) Foreign Application Priority Data
May 7, 2019 (KR) .......................... 10-2019-0053220

(51) Int. Cl.
*B01J 20/26* (2006.01)
*B01J 20/28* (2006.01)
*B01J 20/30* (2006.01)
*C08F 20/06* (2006.01)
*C08J 3/075* (2006.01)
*C08J 3/12* (2006.01)
*C08J 3/24* (2006.01)

(52) U.S. Cl.
CPC ....... *B01J 20/267* (2013.01); *B01J 20/28004* (2013.01); *B01J 20/28021* (2013.01); *B01J 20/3021* (2013.01); *B01J 20/3085* (2013.01); *C08F 20/06* (2013.01); *C08J 3/075* (2013.01); *C08J 3/12* (2013.01); *C08J 3/245* (2013.01); *C08F 2810/20* (2013.01); *C08J 2333/02* (2013.01)

(58) Field of Classification Search
CPC ............................ C08F 220/06; C08F 222/102
See application file for complete search history.

(56) References Cited

U.S. PATENT DOCUMENTS

| | | | |
|---|---|---|---|
| 6,455,600 B1 | 9/2002 | Hahnle et al. | |
| 8,791,210 B2 | 7/2014 | Sakamoto et al. | |
| 9,074,030 B2 | 7/2015 | Takaai et al. | |
| 9,243,079 B2 | 1/2016 | Sakamoto et al. | |
| 9,315,640 B2 | 4/2016 | Takaai et al. | |
| 9,334,376 B2 | 5/2016 | Nakatsuru et al. | |
| 9,447,203 B2 | 9/2016 | Machida et al. | |
| 10,434,495 B2 | 10/2019 | Machida et al. | |
| 2009/0281232 A1* | 11/2009 | Ikeuchi | C08J 3/245 524/786 |
| 2012/0258851 A1* | 10/2012 | Nakatsuru | C08J 3/12 502/7 |
| 2014/0378926 A1 | 12/2014 | Ota et al. | |
| 2015/0283284 A1 | 10/2015 | Azad et al. | |
| 2016/0287915 A1 | 10/2016 | Lenfeld et al. | |
| 2016/0361703 A1 | 12/2016 | Jang et al. | |
| 2016/0375171 A1 | 12/2016 | Omori et al. | |
| 2018/0050321 A1 | 2/2018 | Lee et al. | |
| 2018/0194904 A1 | 7/2018 | Lee et al. | |
| 2018/0228671 A1 | 8/2018 | Hwang et al. | |
| 2018/0298132 A1* | 10/2018 | Yorino | C08K 5/32 |
| 2019/0100629 A1 | 4/2019 | Nam et al. | |
| 2019/0119452 A1* | 4/2019 | Yoon | C08F 20/06 |
| 2019/0308171 A1 | 10/2019 | Kim et al. | |
| 2021/0353257 A1* | 11/2021 | Arcand | A61K 49/223 |

FOREIGN PATENT DOCUMENTS

| | | |
|---|---|---|
| CN | 102712712 A | 10/2012 |
| CN | 105848776 A | 8/2016 |
| CN | 107922637 A | 4/2018 |
| CN | 108884241 A | 11/2018 |
| CN | 109312082 A | 2/2019 |
| EP | 1059947 B1 | 9/2004 |
| EP | 2518092 A1 | 10/2012 |
| EP | 2930191 A1 | 10/2015 |
| EP | 3056521 A1 | 8/2016 |
| EP | 3 072 596 A1 * | 9/2016 |
| EP | 3085439 A1 | 10/2016 |
| EP | 3248993 A1 | 11/2017 |
| EP | 3312218 A1 | 4/2018 |
| JP | 2005126474 A | 5/2005 |
| JP | 4736316 B2 | 7/2011 |
| JP | 2013132433 A | 7/2013 |
| JP | 5367364 B2 | 12/2013 |
| JP | 2017509377 A | 4/2017 |
| JP | 2018203997 A | 12/2018 |
| KR | 101037551 B1 | 5/2011 |
| KR | 20120132475 A | 12/2012 |
| KR | 20150116418 A | 10/2015 |
| KR | 20160076422 A | 6/2016 |
| KR | 20170075643 A | 7/2017 |
| KR | 20170100395 A | 9/2017 |
| KR | 20180003815 A | 1/2018 |

(Continued)

OTHER PUBLICATIONS

Search Report dated Aug. 9, 2022 from the Office Action for Chinese Application No. 202080006910.4 issued Aug. 15, 2022, pp. 1-3.

(Continued)

*Primary Examiner* — Joseph D Anthony
(74) *Attorney, Agent, or Firm* — Lerner David LLP

(57) ABSTRACT

The present disclosure relates to a method for preparing a super absorbent polymer that enables the preparation of a more improved super absorbent polymer even without excessive use of a surfactant and use of a foaming agent, and a super absorbent polymer prepared therefrom which exhibits a superior absorption rate.

7 Claims, No Drawings

(56) References Cited

FOREIGN PATENT DOCUMENTS

| KR | 20180067941 A | 6/2018 |
|----|---------------|--------|
| KR | 20180074586 A | 7/2018 |
| WO | 2008118237 A1 | 10/2008 |
| WO | 2011078298 A1 | 6/2011 |
| WO | 2015093594 A1 | 6/2015 |
| WO | 2016204302 A1 | 12/2016 |
| WO | 2018147317 A1 | 8/2018 |

OTHER PUBLICATIONS

Third Party Observation for Application No. PCT/KR2020/005854 submitted Aug. 31, 2021, pp. 1-9.
International Search Report for Application No. PCT/KR2020/005854, mailed Sep. 23, 2020, 3 pages.
Odian, George, Principles of Polymerization, Second Edition, published Oct. 1981, p. 203, John Wiley & Sons, Inc.
Schwalm, Reinhold, "UV Coatings; Basics, Recent Developments and New Applications", published Dec. 21, 2006, p. 115, Elsevier Science.
Extended European Search Report including Written Opinion for Application No. 20802258.2 dated Feb. 17, 2022, pp. 1-9.

\* cited by examiner

PREPARATION METHOD OF SUPER ABSORBENT POLYMER AND SUPER ABSORBENT POLYMER PREPARED THEREFROM

CROSS-REFERENCE TO RELATED APPLICATION(S)

The present application is a national phase entry under 35 U.S.C. § 371 of International Application No. PCT/KR2020/005854, filed May 4, 2020, which claims priority to Korean Patent Application No. 10-2019-0053220, filed on May 7, 2019, the disclosures of which are incorporated herein by reference in their entirety.

TECHNICAL FIELD

The present disclosure relates to a method for preparing a super absorbent polymer that enables the preparation of a more improved super absorbent polymer even without excessive use of a surfactant and use of a foaming agent, and a super absorbent polymer prepared therefrom.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, not only the super absorbent polymer needs to basically exhibit high absorption performance and absorption rate.

Accordingly, in recent years, attempts have been continuously made to prepare and provide a super absorbent polymer exhibiting a more improved absorption rate.

The most common method for increasing the absorption rate may be a method of widening the surface area of the super absorbent polymer by forming a porous structure inside the super absorbent polymer.

In order to widen the surface area of the super absorbent polymer in this way, conventionally, a method of forming a porous structure in a base polymer powder by performing the crosslinking polymerization using a carbonate foaming agent, or a method of forming the porous structure by introducing bubbles into a monomer mixture in the presence of a surfactant and/or a dispersing agent and then performing crosslinking polymerization, and the like, have been applied.

However, it was difficult to achieve the absorption rate of a certain level or higher even by any method previously known in the art, and thus there has been a continuing need for the development of techniques that makes it possible to further improve the absorption rate.

Furthermore, conventional methods inevitably involve the use of an excessive amount of foaming agents and/or surfactants in order to obtain a super absorbent polymer having more improved absorption rate. As a result, they showed disadvantages that various physical properties such as surface tension, liquid permeability or bulk density of the super absorbent polymer are reduced.

Thus, there is a continuing need to develop a technique capable of further improving the absorption rate of the super absorbent polymer while reducing the use of surfactants and/or foaming agents.

DETAILED DESCRIPTION OF THE INVENTION

Technical Problem

The present disclosure provides a method for preparing a super absorbent polymer that enables the preparation of a more improved super absorbent polymer even without excessive use of a surfactant and use of a foaming agent.

Further, the present disclosure provides a super absorbent polymer prepared by the above-described preparation method, exhibiting more improved absorption rate and excellent various physical properties.

Technical Solution

Provided herein is a method for preparing a super absorbent polymer comprising the steps of:
performing crosslinking polymerization of a monomer mixture including a water-soluble ethylenically unsaturated monomer having an acidic group of which at least a part is neutralized, an anionic surfactant having an HLB value of 20 to 40 and an internal crosslinking agent to form a hydrogel polymer;
drying, pulverizing and classifying the hydrogel polymer to form a base polymer powder; and
further cross-linking the surface of the base polymer powder in the presence of a surface crosslinking agent to form a surface cross-linked layer,
wherein the anionic surfactant is used at a concentration of 50 to 200 ppmw in the monomer mixture, and
wherein the monomer mixture is formed by a method comprising a step of mixing a solution containing the anionic surfactant with a mixture containing the monomer and the internal crosslinking agent while passing the solution through a tubular flow channel having a plurality of projecting pins therein at a space velocity of 50 to 1500 $(\text{min}^{-1})$.

Also provided herein is also provided a super absorbent polymer comprising:
a base polymer powder including a first cross-linked polymer of a water-soluble ethylenically unsaturated monomer having an acidic group of which at least a part is neutralized; and a surface crosslinked layer formed on the base polymer powder in which the first cross-linked polymer is further crosslinked via a surface crosslinking agent, wherein the super absorbent polymer has an absorption rate (vortex time) measured by a vortex test method of 5 to 35 seconds, a surface tension of 65 to 72 mN/m, and a bulk density of 0.50 to 0.65 g/ml.

Hereinafter, a super absorbent polymer and a method for preparing the same according to embodiments of the present disclosure will be described in detail.

According to one embodiment of the present disclosure, there is provided a method for preparing a super absorbent polymer comprising the steps of:

performing crosslinking polymerization of a monomer mixture including a water-soluble ethylenically unsaturated monomer having an acidic group of which at least a part is neutralized, an anionic surfactant having an HLB value of 20 to 40 and an internal crosslinking agent to form a hydrogel polymer;

drying, pulverizing and classifying the hydrogel polymer to form a base polymer powder; and further cross-linking the surface of the base polymer powder in the presence of a surface crosslinking agent to form a surface cross-linked layer, wherein the anionic surfactant is used at a concentration of 50 to 200 ppmw in the monomer mixture, and wherein the monomer mixture is formed by a method comprising a step of mixing a solution containing the anionic surfactant with a mixture containing the monomer and the internal crosslinking agent while passing the solution through a tubular flow channel having a plurality of projecting pins therein at a space velocity of 50 to 1500 (min$^{-1}$).

In the preparation method of one embodiment, anionic surfactants satisfying specific HLB values are included in the monomer mixture, wherein the monomer mixture is formed by mixing an anionic surfactant solution with a mixture containing the monomer and the internal crosslinking agent while passing the solution through a particular type of tubular flow channel at a space velocity of 50 to 1500 (min$^{-1}$).

When a solution containing an anionic surfactant is mixed with a monomer or the like to form a monomer mixture in this way, formation of bubbles in the solution can be greatly promoted while the solution containing the anionic surfactant collides with a plurality of protruding pins in the tubular flow channel. Moreover, due to the action of the fixed amount of anionic surfactant, the bubbles can be highly stabilized, and such bubbles can be retained in a large amount within the monomer mixture.

As a result, when crosslinking polymerization is performed using the monomer mixture formed by the above method, it was confirmed that formation of bubbles is promoted compared to any conventional method, and thus a base polymer powder and a super absorbent polymer having a highly developed porous structure can be prepared.

Therefore, according to the method of one embodiment, as it has a highly developed porous structure, a super absorbent polymer exhibiting a further improved absorption rate can be prepared. Furthermore, it has been found that since the use of a carbonate-based foaming agent can be omitted and the amount of the anionic surfactant used is also relatively reduced, other physical properties of the super absorbent polymer, such as surface tension, liquid permeability or bulk density can be maintained excellently.

Hereinafter, the preparation method of one embodiment and the super absorbent polymer obtained therefrom will be described in more detail.

First, in the preparation method of this embodiment, the water-soluble ethylenically unsaturated monomer may be any monomer commonly used for the preparation of a super absorbent polymer. As a non-limiting example, the water-soluble ethylenically unsaturated monomer may be a compound represented by the following Chemical Formula 1:

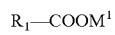   [Chemical Formula 1]

$R_1$—COOM$^1$ in Chemical Formula 1, $R_1$ is an alkyl group having 2 to 5 carbon atoms containing an unsaturated bond, $M^1$ is a hydrogen atom, a monovalent or divalent metal, an ammonium group or an organic amine salt.

Preferably, the monomer may be one or more selected from the group consisting of (meth)acrylic acid, and monovalent metal salts, divalent metal salts, ammonium salts, and organic amine salts of these acids. When a (meth)acrylic acid and/or a salt thereof is used as the water-soluble ethylenically unsaturated monomer in this way, it is advantageous in that a super absorbent polymer having improved water absorptivity is obtained. In addition, as the monomer, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, (meth)acrylamide, N-substituted (meth)acrylate, 2-hydroxyethyl (meth)acrylate, 2-hydroxypropyl(meth)acrylate, methoxypolyethyleneglycol(meth)acrylate, polyethyleneglycol (meth)acrylate, (N,N)-dimethylaminoethyl(meth)acrylate, (N,N)-dimethylaminopropyl(meth)acrylamide, and the like may be used.

Here, the water-soluble ethylenically unsaturated monomer may be those having an acidic group of which at least a part is neutralized. Preferably, the monomer may be those in which the monomer is partially neutralized with a basic substance such as sodium hydroxide, potassium hydroxide, ammonium hydroxide or the like.

In this case, the degree of neutralization of the monomer may be 55 to 95 mol %, or 60 to 80 mol %, or 65 to 75 mol %. The range of the degree of neutralization may vary depending on the final physical properties. An excessively high degree of neutralization causes the neutralized monomers to be precipitated, and thus polymerization may not readily occur, whereas an excessively low degree of neutralization not only greatly deteriorates the absorbency of the polymer but also endows the polymer with hard-to-handle properties, like elastic rubber.

For example, the monomer mixture containing the monomer may be provided in a solution state such as an aqueous solution. The concentration of the water-soluble ethylenically unsaturated monomer in the monomer mixture may be properly controlled, in consideration of a polymerization time and reaction conditions, and for example, the concentration may be 20 to 90% by weight, or 40 to 65% by weight.

This concentration range may be advantageous for using gel effect phenomenon occurring in the polymerization reaction of a high-concentration aqueous solution to eliminate a need for removing the unreacted monomer after the polymerization and also for improving pulverization efficiency in pulverization process of the polymer described below. However, if the concentration of the monomer is too low, the yield of the super absorbent polymer may become low. On the contrary, if the concentration of the monomer is too high, there is a process problem that a part of the monomers is precipitated, or pulverization efficiency is lowered upon pulverization of the polymerized hydrogel polymer, and the physical properties of the super absorbent polymer may be reduced.

Meanwhile, the above-mentioned monomers can be mixed together with an anionic surfactant having an HLB value of 20 to 40 and an internal crosslinking agent in a solvent such as an aqueous solvent to form a monomer mixture.

As the anionic surfactant, any ionic surfactant known to have the HLB value may be used. Examples of such anionic surfactants may be one or more selected from the group consisting of sodium dodecyl sulfate, ammonium lauryl sulfate, sodium laureth sulfate, dioctyl sodium sulfosuccinate, perfluorooctane sulfonate, perfluorobutane sulfonate, alkyl-aryl ether phosphate, alkyl ether phosphate, sodium myreth sulfate and carboxylate salt.

Such anionic surfactant may be contained at a concentration of 50 to 200 ppmw, or 60 to 190 ppmw, or 70 to 180 ppmw in the monomer mixture. If the concentration of the anionic surfactant is too low, the absorption rate becomes insufficient, and if the concentration of the anionic surfactant is too high, the other physical properties of the super absorbent polymer such as absorbency under load, liquid permeability, surface tension or bulk density may be deteriorated.

Meanwhile, the monomer mixture may further contain 0.1 wt % or less, or 0.1% to 0.1 wt %, or 0.001% to 0.07 wt %, of the nonionic surfactant having an HLB value of 4 to 15 in addition to the anionic surfactant. Due to the additional inclusion of such nonionic surfactants, the porous structure of the super absorbent polymer can be further developed, thus further improving its absorption rate.

As the nonionic surfactant, any nonionic surfactant known to have the HLB value may be used. Examples of such nonionic surfactants may be one or more selected from the group consisting of fatty acid ester, sorbitan trioleate, polyethoxylated sorbitan monooleate (product name: TWEEN 80), sorbitan monooleate (product name: SPAN 80) and sugar ester (product name: S-570).

And, an internal crosslinking agent is further included in the monomer mixture. As the internal crosslinking agent, any compound can be used as long as it enables introduction of a crosslink bond upon polymerization of the water-soluble ethylenically unsaturated monomer. Non-limiting examples of the internal crosslinking agent may include multifunctional crosslinking agents, such as N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto.

Such an internal crosslinking agent may be added at a concentration of about 0.001 to 1% by weight based on the monomer mixture. That is, when the concentration of the internal crosslinking agent is too low, the absorption rate of the polymer is lowered and the gel strength may be weakened, which is not preferable. Conversely, when the concentration of the internal crosslinking agent is too high, the absorption capacity of the polymer is lowered, which may be undesirable as an absorber.

Meanwhile, the monomer mixture, for example, the monomer aqueous solution may further contain one or more additive selected from the group consisting of a polyvalent metal salt, a photoinitiator, a thermal initiator, and a polyalkylene glycol-based polymer, in addition to the above-mentioned monomer, internal crosslinking agent and surfactant.

Such additive may be used to further improve the liquid permeability or the like of the super absorbent polymer (polyvalent metal salt or polyalkylene glycol-based polymer, etc.), or to smooth the crosslinking polymerization and further improve the physical properties of the super absorbent polymer.

The above-mentioned additives may be used in an amount of 2000 ppmw or less, or 0 to 2000 ppmw, or 10 to 1000 ppmw, or 50 to 500 ppmw, based on 100 parts by weight of the monomer, depending on their respective roles. Thereby, it is possible to further improve the physical properties such as the absorption rate, liquid permeability, and absorption performance of the super absorbent polymer.

As the polyalkylene glycol-based polymer among the above-mentioned additives, polyethylene glycol, polypropylene glycol, or the like may be used.

In addition, as the photo (polymerization) initiator and/or the thermal (polymerization) initiator, any polymerization initiator commonly used for the preparation of a super absorbent polymer can be used. Particularly, even in the case of the photo-polymerization method, a certain amount of heat is generated by ultraviolet irradiation or the like. Further, as the polymerization reaction, which is an exothermic reaction, proceeds, a certain amount of heat is generated and thus, a photo (polymerization) initiator and/or a thermal (polymerization) initiator can be used together to prepare a super absorbent polymer having more excellent absorption rate and various physical properties.

As the thermal (polymerization) initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), and the like. Further, examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, 4,4-azobis-(4-cyanovaleric acid) and the like. More various thermal polymerization initiators are well disclosed in "Principle of Polymerization" written by Odian, (Wiley, 1981), p 203, which may be incorporated herein by reference.

Further, the photo (polymerization) initiator may be, for example, one or more compounds selected from the group consisting of benzoin ether, dialkyl acetophenone, hydroxyl alkylketone, phenyl glyoxylate, benzyl dimethyl ketal, acyl phosphine and α-aminoketone. As the specific example of acyl phosphine, commercially available Lucirin TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, which may be incorporated herein by reference.

Such polymerization initiator may be added at a concentration of 500 ppmw or less, based on 100 parts by weight of the monomer. That is, if the concentration of the polymerization initiator is too low, the polymerization rate becomes low and thus a large amount of residual monomers may be extracted from the final product, which is not preferable. On the contrary, if the concentration of the polymerization initiator is high than the above range, the polymer chains constituting the network becomes short, and thus the content of water-soluble components is increased and physical properties of the polymer may deteriorate such as a reduction in absorbency under load, which is not preferable.

Meanwhile, in addition to the above-mentioned respective components, the monomer mixture may further contain additives such as a thickener, a plasticizer, a preservation stabilizer, and an antioxidant, if necessary.

The monomer mixture may be prepared in the form of a solution in which the raw materials such as the above-mentioned monomers are dissolved in a solvent. In this case, as the usable solvent, any solvent may be used without limitations in the constitution, as long as it is able to dissolve the above raw materials. Example of the solvent that can be used include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

And, the above-mentioned monomer mixture having the form of an aqueous solution or the like can be controlled so that the initial temperature has a temperature of 30 to 60° C., and the light energy or thermal energy is applied thereto to perform the crosslinking polymerization.

Meanwhile, according to one embodiment of one embodiment of the invention, the monomer mixture may be formed by a method comprising the steps of:
forming a primary mixture in a solution state containing the water-soluble ethylenically unsaturated monomer and an internal crosslinking agent;
mixing the primary mixture with a basic aqueous solution to form a secondary mixture in which at least a part of the acid groups of the unsaturated monomer is neutralized; and
generating a large amount of bubbles while passing a solution containing a nonionic surfactant having an HLB value of 4 to 15, and a solution containing an initiator, other additives and an anionic surfactant through a tubular flow channel having a plurality of projecting pins therein at a space velocity of 50 to 1500 (min$^{-1}$), or 200 to 1300 (min$^{-1}$), or 300 to 1000 (min$^{-1}$), followed by mixing with the secondary mixture containing the neutralized monomer.

In the final stage of such method, more suitably, nonionic surfactants that are not well mixed with other components other than the monomer due to hydrophobicity can be first mixed, and the anionic surfactant for promoting/stabilizing the generation of bubbles in the monomer may be finally added and mixed.

Further, in order to achieve the concentration range of the anionic surfactant in the above-mentioned monomer mixture, in the step of adding and mixing the solution containing the anionic surfactant, it can be proceeded by a method comprising the steps of supplying an aqueous solution containing the anionic surfactant at a concentration of 0.1 to 0.3% by weight, followed by mixing with the secondary mixture containing the neutralized monomer.

Due to this method of forming the monomer mixture, the generation of bubbles in the monomer mixture is further promoted/stabilized, and thus the absorption rate of the super absorbent polymer can be further improved.

In particular, in the above-mentioned method, the generation of bubbles is highly activated while the solution containing the anionic surfactant is passed through a tubular flow channel having a plurality of projecting pins therein at constant space velocity, and such solution can be mixed with other components such as monomers to form a monomer mixture. Therefore, the super absorbent polymer prepared by the method of one embodiment can exhibit a greatly improved absorption rate.

In the step of generating a large amount of bubbles by the above-mentioned mixing, it is possible to use a commercialized mixing apparatus having a tubular flow channel having the projecting pin. As an example of such a commercialized mixing apparatus, there can be mentioned a microbubble generator (manufactured by "02 Bubble").

Meanwhile, after the monomer mixture is formed by the above-described method, such a monomer mixture is subjected to crosslinking polymerization to form a hydrogel polymer.

The formation of hydrogel polymer through crosslinking polymerization of such a monomer mixture can be carried out by a conventional polymerization method, and the process is not particularly limited. However, in order to proceed polymerization while stably maintaining bubbles in the monomer mixture formed by the above-mentioned method (i.e., to form a polymer having a more developed porous structure), it is more preferable that the crosslinking polymerization is performed by (aqueous) solution polymerization.

Further, the polymerization process may be largely classified into a thermal polymerization and a photo-polymerization depending on a polymerization energy source. The thermal polymerization may be performed in a reactor like a kneader equipped with agitating spindles, and the photo-polymerization can be carried out in a reactor equipped with a movable conveyor belt.

As an example, the monomer mixture is injected into a reactor like a kneader equipped with the agitating spindles, and thermal polymerization is performed by providing hot air thereto or heating the reactor, to thereby obtain the hydrogel polymer. In this case, the hydrogel polymer, which is discharged from the outlet of the reactor according to the type of agitating spindles equipped in the reactor, can be obtained into a particle having several millimeters to several centimeters. Specifically, the resulting hydrogel polymer may be obtained in various forms according to the concentration of the monomer mixture injected thereto, the injection speed, or the like, and a hydrogel polymer having a (weight average) particle size of 2 to 50 mm may be generally obtained.

As another example, when the photo-polymerization of the monomer mixture is carried out in a reactor equipped with a movable conveyor belt, the hydrogel polymer may be obtained as a sheet. In this case, the thickness of the sheet may vary according to the concentration of the monomer mixture injected thereto and the injection speed. Usually, the polymer sheet is preferably controlled to have a thickness of 0.5 cm to 5 cm in order to uniformly polymerize the entire sheet and also secure preparation speed.

In this case, the hydrogel polymer obtained by the above-mentioned method may have a water content of 40 to 80% by weight. Meanwhile, the "water content" as used herein means a weight occupied by moisture with respect to a total amount of the hydrogel polymer, which may be the value obtained by subtracting the weight of the dried polymer from the weight of the hydrogel polymer. Specifically, the water content can be defined as a value calculated by measuring the weight loss due to evaporation of water in the polymer during the drying process of increasing the temperature of the polymer with infrared heating. At this time, the water content is measured under the drying conditions determined as follows: the drying temperature is increased from room temperature to about 180° C., and then the temperature is maintained at 180° C., and the total drying time is set as 20 minutes, including 5 minutes for the temperature rising step.

On the other hand, after the hydrogel polymer is prepared by the above-mentioned method, the step of drying and pulverizing the hydrogel polymer may be carried out. Prior to such drying, the step of coarsely pulverizing the hydrogel polymer to produce a hydrogel polymer having a small average particle size may be first carried out.

In this coarse pulverization step, the hydrogel polymer can be pulverized into a size of 1.0 mm to 2.0 mm.

A pulverizing machine used in the coarse pulverization is not limited by its configuration, and specific examples thereof may include any one selected from the group consisting of a vertical pulverizer, a turbo cutter, a turbo grinder, a rotary cutter mill, a cutter mill, a disc mill, a shred crusher, a crusher, a chopper, and a disc cutter, but the present disclosure is not limited to the above-described examples.

Further, for the efficiency of the coarse pulverization, the coarse pulverization can be carried out multiple times depending on the size of the particle size. For example, the hydrogel polymer is subjected to a primary coarse pulverization into an average particle size of about 10 mm, again to a secondary coarse pulverization into an average particle size of about 5 mm, and then a third coarse pulverization into the above-mentioned particle size.

On the other hand, after the optional coarse pulverization, the hydrogel polymer can be dried. This drying temperature may be 50 to 250° C. When the drying temperature is less than 50° C., it is likely that the drying time becomes too long or the physical properties of the finally prepared super absorbent polymer is deteriorated, and when the drying temperature is higher than 250° C., only the surface of the polymer is excessively dried, which may cause fine powder generation, and the physical properties of a finally prepared super absorbent polymer may be deteriorated. The drying may be carried out preferably at a temperature of 150 to 200° C., still more preferably at a temperature of 160 to 190° C. Meanwhile, the drying time may be 20 minutes to 15 hours, in consideration of the process efficiency and the like, but the present disclosure is not limited thereto.

The drying method may be selected and used without being limited by its constitution if it is a method generally used for the above drying step. Specifically, the drying step may be carried out by methods such as hot air supply, infrared irradiation, microwave irradiation or ultraviolet irradiation. After the drying step as above is carried out, the water content of the polymer may be 0.05 to 10% by weight.

Next, the step of (finely) pulverizing the dried polymer obtained through such a drying step is carried out.

The polymer powder obtained after the pulverization step may have a particle size of 150 to 850 µm. Specific examples of a pulverizing device that can be used to pulverize into the above particle size may include a ball mill, a pin mill, a hammer mill, a screw mill, a roll mill, a disc mill, a jog mill or the like, but the present disclosure is not limited to the above-described example.

Then, in order to control the physical properties of the super absorbent polymer powder finally commercialized after the pulverization step, a separate step of classifying the polymer powder obtained after the pulverization depending on the particle size may be performed.

This classifying step can be carried out, for example, by a method of separating normal particles having a particle size of 150 to 850 µm and fine particles or macroparticles which fall outside such particle size range.

This classifying step can be carried out using a standard sieve according to a general method of classifying a super absorbent polymer.

The base polymer powder having such a particle size, that is, a particle size of 150 to 850 µm, can be commercialized through a surface crosslinking reaction step described hereinafter.

On the other hand, after progressing up to the classification described above, a super absorbent polymer can be prepared by performing a step of crosslinking the surface of the base polymer powder, that is, by heat-treating and surface-crosslinking the base polymer powder in the presence of a surface crosslinking solution containing a surface crosslinking agent.

Here, the kind of the surface crosslinking agent contained in the surface crosslinking solution is not particularly limited. As a non-limiting example, the surface cross-linking agent may be one or more compounds selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene carbonate, ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

In this case, the content of the surface crosslinking agent can be appropriately controlled depending on the kind thereof, reaction conditions, and the like. Preferably, it can be controlled to 0.001 to 5 parts by weight based on 100 parts by weight of the base polymer powder. When the content of the surface crosslinking agent is too low, the surface crosslinking is not properly introduced, and the physical properties of the final super absorbent polymer may be deteriorated. On the contrary, when the surface crosslinking agent is used in an excessive amount, the absorption capacity of the super absorbent polymer may be rather lowered due to excessive surface crosslinking reaction, which is not preferable.

Further, the surface crosslinking solution may further include one or more solvents selected from the group consisting of water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide. The solvent may be contained in an amount of 0.5 to 10 parts by weight based on 100 parts by weight of the base polymer.

Further, the surface crosslinking solution may further include a thickener. When the surface of the base polymer powder is further crosslinked in the presence of the thickener in this way, deterioration of the physical properties may be minimized even after pulverization. Specifically, one or more selected from polysaccharides and polymers containing hydroxyl groups are used as the thickener. As the polysaccharides, gum-based thickeners and cellulose-based thickeners may be used. Specific examples of the gum-based thickeners may include xanthan gum, arabic gum, karaya gum, tragacanth gum, ghatti gum, guar gum, locust bean gum, psyllium seed gum, etc., and specific examples of the cellulose-based thickeners may include hydroxypropylmethylcellulose, carboxymethylcellulose, methylcellulose, hydroxymethylcellulose, hydroxyethylcellulose, hydroxypropylcellulose, hydroxyethylmethylcellulose, hydroxymethylpropylcellulose, hydroxyethylhydroxypropylcellulose, ethylhydroxyethylcellulose, methylhydroxypropylcellulose, etc. Meanwhile, specific examples of the polymers containing hydroxyl groups may include polyethylene glycol, polyvinyl alcohol, etc.

On the other hand, in order to perform the surface crosslinking, a method of adding and mixing the surface crosslinking solution and the base polymer in a reaction tank, a method of spraying a surface crosslinking solution onto the base polymer, a method of continuously providing and mixing the base polymer and the surface crosslinking solution to a continuously operating mixer, or the like may be used.

The surface crosslinking may be performed at a temperature of 100 to 250° C., and may be continuously performed after the drying and pulverizing steps proceeding at a relatively high temperature. At this time, the surface crosslinking reaction may be carried out for 1 to 120 minutes, or 1 to 100 minutes, or 10 to 60 minutes. In other words, in order to prevent the polymer particles from being damaged during the excessive reaction and thus the deterioration of the physical properties, while inducing the surface crosslinking reaction at the minimum, it may be carried out under the conditions of the surface crosslinking reaction described above.

As the super absorbent polymer prepared as described above has a highly developed porous structure, it can exhibit improved absorption rate, and along with this, other various physical properties can also maintain excellent properties.

In this regard, according to another embodiment of the invention, there is provided a super absorbent polymer comprising: a base polymer powder including a first cross-linked polymer of a water-soluble ethylenically unsaturated monomer having an acidic group of which at least a part is neutralized; and a surface crosslinked layer formed on the base polymer powder in which the first cross-linked polymer is further crosslinked via a surface crosslinking agent,
wherein the super absorbent polymer has an absorption rate (vortex time) measured by a vortex test method of 5 to 35 seconds, or 5 to 30 seconds, or 10 to 30 seconds, or 20 to 29 seconds, a surface tension of 65 to 72 mN/m, or 65 to 70 mN/m, or 66 to 70 mN/m, and a bulk density of 0.50 to 0.65 g/ml, or 0.55 to 0.62 g/ml, or 0.56 to 0.61 g/ml.

The super absorbent polymer of the other embodiment can exhibit a greatly improved absorption rate, which is defined as a vortex absorption rate of 35 seconds or less which could not be achieved at all in the past. Furthermore, as the super absorbent polymer is prepared by reducing the use amount of a foaming agent and/or a surfactant, excellent surface tension and bulk density can be maintained.

In the super absorbent polymer of the other embodiment, the absorption rate can be confirmed by a method of measuring the time (unit: second) required for the liquid vortex to disappear due to quick absorption when adding the super absorbent resin to a physiological saline solution and stirring it. The bulk density and surface tension can be measured according to the method described in Examples provided hereinafter.

The super absorbent polymer of the other embodiment has a particle size of 150 to 850 μm, may contain the particles having a particle size of 600 μm or more in an amount of 12 wt % or less, or 10 wt % or less, and may contain the particles having a particle size of 300 μm or less in an amount of 20 wt % or less, or 15 wt % or less.

As the super absorbent polymer has such a uniform particle size distribution, the super absorbent polymer can exhibit excellent and uniform absorption characteristics.

Further, the super absorbent polymer may have a centrifuge retention capacity (CRC) of 25 to 35 g/g, or 28 to 34 g/g, or 29 to 33 g/g, as measured according to EDANA recommended test method WSP 241.3. Such centrifuge retention capacity can reflect the excellent absorption capacity of the super absorbent polymer.

Further, the super absorbent polymer of the other embodiment may exhibit characteristics that an absorbency under load (AUL) at 0.9 psi as measured according to EDANA recommended test method WSP 242.3 is 16 to 23 g/g, or 18 to 21 g/g. By satisfying these ranges, the super absorbent polymer can exhibit excellent absorption capacity and moisture retaining properties even under load.

The super absorbent polymer may exhibit characteristics that a gel bed permeability (GBP) is 25 to 50 darcy, or 30 to 48 darcy, or 35 to 45 darcy, and thereby, excellent liquid permeability can be exhibited.

Advantageous Effects

As described above, according to the present disclosure, there can be provided a method for preparing a super absorbent polymer which enables preparation of super absorbent polymers with more improved properties without excessive use of a surfactant and use of a foaming agent.

The super absorbent polymer prepared by such a method can exhibit more improved absorption rate, and the use amount of the surfactant and/or the foaming agent during the process is reduced, thereby minimizing the deterioration of physical properties, and maintaining excellent various physical properties in addition to absorption rate.

Detailed Description of the Embodiments

Hereinafter, preferred examples are presented to aid in understanding of the invention. However, these examples are for illustrative purposes only, and the scope of the invention is not intended to be limited thereby.

Example 1: Preparation of Super Absorbent Polymer 8.6 g (80 ppmw based on the monomer) of 0.5 wt % IRGACURE 819 initiator diluted with acrylic acid and 12.3 g of 20 wt % polyethylene glycol diacrylate (PEGDA, Mw=400) diluted with acrylic acid were mixed to prepare a solution (solution A).

540 g of acrylic acid and the solution A were injected into a 2 L-volume glass reactor surrounded by a jacket through which a heating medium pre-cooled at 25° C. was circulated.

Then, to the glass reactor, 832 g of 25 wt % caustic soda solution (solution C) was slowly added dropwise and mixed. After confirming that the temperature of the mixed solution increased to about 72° C. or higher by neutralization heat, the mixed solution was left until it was cooled. A neutralization degree of acrylic acid in the mixed solution thus obtained was about 70 mol %.

On the other hand, as a surfactant, a solution containing sodium dodecylsulfate (HLB: about 40) diluted with water and SPAN-80 (HLB: 4.6) was converted to a solution D containing bubbles using a microbubble machine (OB-750S, manufactured by 02 Bubble) circulating at a flow rate of 500 kg (500 (min$^{-1}$))/h. In addition, 30 g of 4 wt % sodium persulfate solution (solution E) diluted with water was prepared. Then, when the temperature of the mixed solution was cooled to about 45° C., solutions D and E previously prepared were added to the mixed solution and mixed. At this time, the content of sodium dodecyl sulfate in the solution D was adjusted to 110 ppmw relative to acrylic acid, and SPAN-80 to 50 ppmw so that the total amount of the surfactant was 160 ppmw.

Then, the above-prepared mixed solution was poured in a Vat-type tray (15 cm in width×15 cm in length) installed in a square polymerizer which had a light irradiation device installed at the top and was preheated to 80° C. The mixed solution was then subjected to light irradiation. It was confirmed that at about 20 seconds after light irradiation, gel was formed from the surface, and that at about 30 seconds after light irradiation, polymerization occurred concurrently with forming. Then, the polymerization reaction was allowed for additional 2 minutes, and the polymerized sheet was taken and cut into a size of 3 cm×3 cm.

Then, it was subjected to a chopping process using a meat chopper to prepare the cut sheet as crumbs. The average particle size of the prepared crumbs was 1.5 mm.

Then, the crumbs were dried in an oven capable of shifting airflow up and down. The crumbs were uniformly dried by flowing hot air at 180° C. from the bottom to the top for 15 minutes and from the top to the bottom for 15 minutes such that the dried crumbs had a water content of about 2 wt % or less. The dried crumbs were pulverized using a pulverizer and classified, and a base polymer having a size of 150 to 850 um was obtained.

Subsequently, 100 g of the above-prepared base polymer was mixed with a crosslinking agent solution which was obtained by mixing 4.5 g of water, 1 g of ethylene carbonate, 0.05 g of Aerosil 200 (EVONIK) and 0.25 g of 20 wt % water-dispersed silica (Snowtex, ST-O) solution, and then surface crosslinking reaction was performed at 190° C. for 30 minutes. The resulting product was pulverized and then passed through a sieve to obtain a surface-crosslinked super absorbent polymer having a particle size of 150 to 850 um. 0.1 g of Aerosil 200 was further mixed with the obtained super absorbent by a dry method to prepare a super absorbent polymer.

Example 2: Preparation of Super Absorbent Polymer

A super absorbent polymer was prepared in the same manner as in Example 1, except that only anionic surfactant sodium dodecyl sulfate was used without using a nonionic surfactant SPAN-80, and the content thereof was adjusted to be 80 ppmw relative to acrylic acid.

Example 3: Preparation of Super Absorbent Polymer

A super absorbent polymer was prepared in the same manner as in Example 1, except that only an anionic surfactant sodium dodecyl sulfate was used without using a nonionic surfactant SPAN-80, the content thereof was adjusted to be 160 ppmw relative to acrylic acid, and the finally obtained super absorbent polymer was subjected to a water treatment so as to adjust the water content in the product to about 2% by weight.

Example 4: Preparation of Super Absorbent Polymer

A super absorbent polymer was prepared in the same manner as in Example 1, except that the content of sodium dodecyl sulfate was adjusted to 50 ppmw relative to acrylic acid, and the content of SPAN-80 was adjusted to 250 ppmw relative to acrylic acid.

Example 5: Preparation of Super Absorbent Polymer

A super absorbent polymer was prepared in the same manner as in Example 1, except that the content of sodium dodecyl sulfate was adjusted to 150 ppmw relative to acrylic acid and the content of TWEEN 80 (HLB: 15) was adjusted to 30 ppmw relative to acrylic acid.

Comparative Example 1: Preparation of Super Absorbent Polymer 8.6 g (80 ppmw based on the monomer) of 0.5 wt % IRGACURE 819 initiator diluted with acrylic acid and 12.3 g of 20 wt % polyethylene glycol diacrylate (PEGDA, Mw=400) diluted with acrylic acid were mixed to prepare a solution (solution A).

540 g of acrylic acid and the solution A were injected into a 2 L-volume glass reactor surrounded by a jacket through which a heating medium pre-cooled at 25° C. was circulated.

Then, to the glass reactor, 832 g of 25 wt % caustic soda solution (solution C) was slowly added dropwise and mixed. After confirming that the temperature of the mixed solution increased to about 72° C. or higher by neutralization heat, the mixed solution was left until it was cooled. A neutralization degree of acrylic acid in the mixed solution thus obtained was about 70 mol %.

On the other hand, as a surfactant, a solution D containing sodium dodecylsulfate (HLB: about 40) diluted with water and SPAN-80 (HLB: 4.6) was prepared. In addition, 30 g of 4 wt % sodium persulfate solution (solution E) diluted with water was prepared. Then, when the temperature of the mixed solution was cooled to about 45° C., solutions D and E previously prepared were added to the mixed solution and mixed. At this time, the content of sodium dodecyl sulfate in the solution D was adjusted to 110 ppmw relative to acrylic acid, and SPAN-80 to 50 ppmw so that the total amount of the surfactant was 160 ppmw.

Then, the above-prepared mixed solution was poured in a Vat-type tray (15 cm in width×15 cm in length) installed in a square polymerizer which had a light irradiation device installed at the top and was preheated to 80° C. The mixed solution was then subjected to light irradiation. It was confirmed that at about 20 seconds after light irradiation, gel was formed from the surface, and that at about 30 seconds after light irradiation, polymerization occurred concurrently with forming. Then, the polymerization reaction was performed for additional 2 minutes, and the polymerized sheet was taken and cut in a size of 3 cm×3 cm.

Then, it was subjected to a chopping process using a meat chopper to prepare the cut sheet as crumbs. The average particle size of the prepared crumbs was 1.5 mm.

Then, the crumbs were dried in an oven capable of shifting airflow up and down. The crumbs were uniformly dried by flowing hot air at 180° C. from the bottom to the top for 15 minutes and from the top to the bottom for 15 minutes such that the dried crumbs had a water content of about 2 wt % or less. The dried crumbs were pulverized using a pulverizer and classified by size, and a base polymer having a size of 150 to 850 um was obtained.

Subsequently, 100 g of the above-prepared base polymer was mixed with a crosslinking agent solution which was obtained by mixing 4.5 g of water, 1 g of ethylene carbonate, 0.05 g of Aerosil 200 (EVONIK) and 0.25 g of 20 wt % water-dispersed silica (Snowtex, ST-O) solution, and then surface crosslinking reaction was performed at 190° C. for 30 minutes. The resulting product was pulverized and then passed through a sieve to obtain a surface-crosslinked super absorbent polymer having a particle size of 150 to 850 um. 0.1 g of Aerosil 200 was further mixed with the obtained super absorbent by a dry method to prepare a super absorbent polymer.

Comparative Example 2: Preparation of Super Absorbent Polymer

A super absorbent polymer was prepared in the same manner as in Example 1, except that the content of sodium dodecyl sulfate in the solution D was adjusted to 350 ppmw relative to acrylic acid, and SPAN-80 to 50 ppmw so that the total amount of surfactant was 400 ppmw.

Comparative Example 3: Preparation of Super Absorbent Polymer

A super absorbent polymer was prepared in the same manner as in Example 1, except that only an anionic surfactant sodium dodecyl sulfate was used without using a nonionic surfactant SPAN-80, and the content thereof was adjusted to be 400 ppmw relative to acrylic acid.

Comparative Example 4: Preparation of Super Absorbent Polymer 8.6 g (80 ppmw based on the monomer) of 0.5 wt % IRGACURE 819 initiator diluted with acrylic acid and 12.3 g of 20 wt % polyethylene glycol diacrylate (PEGDA, Mw=400) diluted with acrylic acid were mixed to prepare a solution (solution A).

540 g of acrylic acid and the solution A were injected into a 2 L-volume glass reactor surrounded by a jacket through which a heating medium pre-cooled at 25° C. was circulated.

Then, to the glass reactor, 832 g of 25 wt % caustic soda solution (solution C) was slowly added dropwise and mixed. After confirming that the temperature of the mixed solution increased to about 72° C. or higher by neutralization heat, the mixed solution was left until it was cooled. A neutralization degree of acrylic acid in the mixed solution thus obtained was about 70 mol %.

On the other hand, as a surfactant, a solution D-1 containing sodium dodecylsulfate diluted with water and a solution D-2 containing 4 wt % sodium dicarbonate were prepared, respectively. In addition, 30 g of 4 wt % sodium persulfate solution (solution E) diluted with water was prepared. Then, when the temperature of the mixed solution was cooled to about 45° C., solutions D-1, D-2 and E previously prepared were added to the mixed solution and mixed. At this time, the content of sodium dodecyl sulfate in the solution D-1 was adjusted to be 200 ppmw relative to acrylic acid.

Then, the above-prepared mixed solution was poured in a Vat-type tray (15 cm in width×15 cm in length) installed in a square polymerizer which had a light irradiation device installed at the top and was preheated to 80° C. The mixed solution was then subjected to light irradiation. It was confirmed that at about 20 seconds after light irradiation, gel was formed from the surface, and that at about 30 seconds after light irradiation, polymerization occurred concurrently with forming. Then, the polymerization reaction was performed for additional 2 minutes, and the polymerized sheet was taken and cut in a size of 3 cm×3 cm.

Then, it was subjected to a chopping process using a meat chopper to prepare the cut sheet as crumbs. The average particle size of the prepared crumbs was 1.5 mm.

Then, the crumbs were dried in an oven capable of shifting airflow up and down. The crumbs were uniformly dried by flowing hot air at 180° C. from the bottom to the top for 15 minutes and from the top to the bottom for 15 minutes such that the dried crumbs had a water content of about 2 wt % or less. The dried crumbs were pulverized using a pulverizer and classified by size, and a base polymer having a size of 150 to 850 um was obtained.

Subsequently, 100 g of the above-prepared base polymer was mixed with a crosslinking agent solution which was obtained by mixing 4.5 g of water, 1 g of ethylene carbonate, 0.05 g of Aerosil 200 (EVONIK) and 0.25 g of 20 wt % water-dispersed silica (Snowtex, ST-O) solution, and then surface crosslinking reaction was allowed at 190° C. for 30 minutes. The resulting product was pulverized and then passed through a sieve to obtain a surface-crosslinked super absorbent polymer having a particle size of 150 to 850 um. 0.1 g of Aerosil 200 was further mixed with the obtained super absorbent by a dry method to prepare a super absorbent polymer.

Experimental Example: Evaluation of Physical Properties of Super Absorbent Polymer The physical properties of the super absorbent polymers prepared in Examples and Comparative Examples were evaluated by the following methods, and the results are shown in Table 1 below.

(1) Bulk Density

About 100 g of the super absorbent polymer was placed in a funnel-shaped bulk density tester and flown down into a 100 ml container. Then, the weight of the super absorbent polymer contained in the container was measured. The bulk density was calculated as (super absorbent polymer weight)/(container volume, 100 ml). (unit: g/ml).

(2) Absorption Rate (Vortex Time)

The absorption rate of the super absorbent polymers of Examples and Comparative Examples was measured in seconds according to the method described in International Publication WO 1987/003208.

Specifically, the absorption rate (or vortex time) was calculated by measuring in seconds the amount of time required for the vortex to disappear after adding 2 g of a super absorbent polymer to 50 mL of physiological saline solution at 23° C. to 24° C. and then stirring a magnetic bar (diameter 8 mm, length 31.8 mm) at 600 rpm.

(3) Centrifuge Retention Capacity (CRC)

The centrifuge retention capacity by water absorption capacity under a non-loading condition was measured in accordance with EDANA (European Disposables and Nonwovens Association) recommended test method No. WSP 241.3.

Specifically, from the polymers obtained through Examples and Comparative Examples, a polymer classified with a sieve of #30-50 was obtained. W0 (g, about 0.2 g) of such polymer was uniformly put in a nonwoven fabric-made bag and sealed. Then, the bag was immersed in a physiological saline solution (0.9 wt %) at room temperature. After 30 minutes, water was removed from the bag by centrifugation at 250 G for 3 minutes, and the weight W2 (g) of the bag was then measured. In addition, the same procedure was carried out without using the polymer, and then the resultant weight W1 (g) was measured. Using the respective weights thus obtained, CRC (g/g) was calculated according to the following equation:

$$\text{CRC (g/g)} = \{[W_2 (g) - W_1 (g)] / W_0 (g)\} - 1 \quad \text{[Mathematical Equation 1]}$$

(4) Absorbency Under Load (AUL)

The absorbency under load at 0.9 psi was measured for each polymer in accordance with EDANA recommended test method No. WSP 242.3.

First, at the time of measuring the absorbency under load, the classified polymer during CRC measurement was used.

Specifically, a 400 mesh stainless steel screen was installed in the bottom of the plastic cylinder having an internal diameter of 25 mm. The super absorbent polymer $W_0$ (g)(0.16 g) was uniformly scattered on the screen at room temperature and humidity of 50%. Subsequently, a piston capable of uniformly providing a load of 0.9 psi was put thereon, in which an external diameter of the piston was slightly smaller than 25 mm such that there was substantially no gap between the internal wall of the cylinder and the piston, and the vertical movement of the cylinder was not interrupted. At this time, the weight $W_3$ (g) of the device was measured.

A glass filter having a diameter of 90 mm and a thickness of 5 mm was placed in a Petri dish having a diameter of 150 mm, and then a physiological saline solution composed of 0.9% by weight of sodium chloride was poured in the Petri dish until the surface level became equal to the upper surface of the glass filter. A sheet of filter paper having a diameter of 90 mm was put thereon. The measuring device was put on the filter paper and the solution was absorbed for 1 hour under the load. After 1 hour, the weight W4 (g) was measured after lifting up the measuring device.

Using the respective weights thus obtained, the absorbency under load (g/g) was calculated according to the following equation.

$$\text{AUL (g/g)} = [W_4 (g) - W_3 (g)] / W_0 (g) \quad \text{[Mathematical Equation 2]}$$

(5) Gel Bed Permeability (GBP)

Free swell gel bed permeability (GBP) in a physiological saline solution was measured for the super absorbent polymers of Examples and Comparative Examples according to the method described in Korean Patent Application. No. 2014-7018005, using the device shown in FIGS. 1 to 3 of Korean Patent Application No. 2014-7018005.

(6) Surface Tension (S/T)

The surface tension of the liquid was measured using a Fisher Surface Tensiometer. The measurement method was as follows. About 150 g of 0.9 wt % saline solution was placed in a 250 mL beaker, and a 2 inch deep vortex was created while stirring with a magnetic stirrer.

Then 1.0±0.01 g of sample was weighed and placed in the stirring solution. When the stirring time exceeded 3 minutes, stirring was stopped, and a stirring rod was removed with clean tweezers, and then the sample was left for at least 15 minutes so as to allow a gel of the sample to settle to the bottom. After leaving for 15 minutes, the tip of the pipette was inserted directly beneath the surface of the test liquid to withdraw sufficient solution.

The test liquid was transferred to the clean sample cup. The sample cup containing the test liquid was placed on the sample table and then the dial was adjusted to zero.

A clean platinum-iridium ring (P-I Ring) was fixed to a tension meter with calibration. The sample table was lifted up by turning a bottom knob in a clockwise direction until it was submerged under the surface of the test liquid of P-I ring.

The P-I ring was immersed for about 35 seconds, and then the rotating pin was loosened to hang freely. The bottom knob was turned until the reference arm was parallel to the line above the mirror. The P-I ring was slowly lifted up at a constant rate.

The scale of dials on the front was recorded when leaving the surface of the test liquid of P-I ring. This is the surface tension expressed by dyne/m$^2$. The actual surface tension value is calculated by correcting the measured surface tension value.

$$\text{Surface Tension(s)} = P \times \left( 0.7250 + \sqrt{\frac{0.01452 \times P}{5.930^2} + 0.04534 - \frac{1.679}{53.1218}} \right)$$

Actual surface tension(s)=$P \times F$

P=measured surface tension (scale read from dial)
F=adjusted equation below $$F = 0.7250 + \sqrt{\frac{0.01452 \times P}{C^2} + 0.04534 - \frac{1.679r}{R}}$$

R=radius of the ring
r=radius of the ring bar
C=circumference of ring

TABLE 1

|  | Bulk density (g/ml) | Vortex (sec) | CRC (g/g) | 0.9 AUL (g/g) | GBP (darcy) | Surface tension (mN/m) |
|---|---|---|---|---|---|---|
| Example 1 | 0.57 | 23 | 30.8 | 18.7 | 45 | 68 |
| Example 2 | 0.59 | 29 | 30.5 | 19.1 | 36 | 70 |
| Example 3 | 0.61 | 25 | 30.1 | 18.2 | 42 | 66 |
| Example 4 | 0.61 | 27 | 30.2 | 18.2 | 44 | 65 |
| Example 5 | 0.6 | 24 | 29.7 | 19.4 | 42 | 66 |
| Comparative Example 1 | 0.64 | 85 | 31.2 | 19.6 | 65 | 68 |
| Comparative Example 2 | 0.49 | 23 | 30.6 | 15.3 | 18 | 58 |
| Comparative Example 3 | 0.62 | 48 | 29.5 | 18.6 | 52 | 71 |
| Comparative Example 4 | 0.6 | 42 | 30.1 | 18.2 | 55 | 68 |

Referring to Table 1, it is confirmed that Examples 1 to 3 exhibit a remarkably improved absorption rate while the physical properties such as water the centrifuge retention capacity, liquid permeability, absorbency under load, surface tension and bulk density are equal to or higher than those of Comparative Examples 1, 3 and 4.

In addition, it is confirmed that in the case of Comparative Example 2, due to excessive use of the surfactant, the bulk density is low, and the physical properties such as absorbency under load and liquid permeability are deteriorated.

The invention claimed is:

1. A method for preparing a super absorbent polymer comprising:
preparing a monomer mixture including a water-soluble ethylenically unsaturated monomer having an acidic group of which at least a part is neutralized;
preparing a solution containing an anionic surfactant;
passing the solution containing the anionic surfactant through a tubular flow channel having a plurality of projecting pins therein at a space velocity of 50 to 1500 (min$^{-1}$);
subsequently mixing the solution containing the anionic surfactant and the monomer mixture to form a mixed solution comprising the anionic surfactant, the monomer mixture, and an internal crosslinking agent;
performing crosslinking polymerization of the mixed solution to form a hydrogel polymer;
drying, pulverizing and classifying the hydrogel polymer to form a base polymer powder; and
further cross-linking the surface of the base polymer powder in the presence of a surface crosslinking agent to form a surface cross-linked layer,
wherein the anionic surfactant is used at a concentration of 50 to 200 ppmw of the water-soluble ethylenically unsaturated monomer.

2. The method for preparing a super absorbent polymer according to claim 1, wherein the anionic surfactant comprises one or more of sodium dodecyl sulfate, ammonium lauryl sulfate, sodium laureth sulfate, dioctyl sodium sulfosuccinate, perfluorooctane sulfonate, perfluorobutane sulfonate, alkyl-aryl ether phosphate, alkyl ether phosphate, sodium myreth sulfate or carboxylate salt.

3. The method for preparing a super absorbent polymer according to claim 1, wherein the monomer mixture further includes 0.1% by weight or less of a nonionic surfactant having an HLB value of 4 to 15.

4. The method for preparing a super absorbent polymer according to claim 3, wherein the nonionic surfactant is one or more selected from the group consisting of fatty acid ester, sorbitan trioleate, polyethoxylated sorbitan monooleate, sorbitan monooleate and sugar ester.

5. The method for preparing a super absorbent polymer according to claim 3, further comprising:
forming a primary mixture in a solution state containing the water-soluble ethylenically unsaturated monomer and the internal crosslinking agent;
mixing the primary mixture with a basic aqueous solution to form a secondary mixture in which at least a part of the acid groups of the unsaturated monomer is neutralized; and
mixing a solution containing the nonionic surfactant having an HLB value of 4 to 15, and a solution containing an initiator, other additives and the anionic surfactant with the secondary mixture while passing the above solutions through the tubular flow channel having the plurality of projecting pins therein at the space velocity of 50 to 1500 (min$^{-1}$).

6. The method for preparing a super absorbent polymer according to claim 5, wherein mixing the solution containing the anionic surfactant further comprises supplying and mixing an aqueous solution containing the anionic surfactant at a concentration of 0.1 to 0.3% by weight of the water soluble ethylenically unsaturated monomer.

7. The method for preparing a super absorbent polymer according to claim 1, wherein the crosslinking polymerization of the hydrogel polymer is performed by solution polymerization with respect to the monomer mixture in an aqueous solution state.

* * * * *